United States Patent [19]
Myhr et al.

[11] 3,739,884
[45] June 19, 1973

[54] MEANS AND METHOD FOR REGULATING A HYDRAULIC ENERGY ABSORBING DEVICE

[75] Inventors: Lars H. Myhr, Norrkoping; Lars-åke E. Svensson, Aby, both of Sweden

[73] Assignee: Borgs Fabriks Aktiebolag, Norrkoping, Sweden

[22] Filed: May 6, 1971

[21] Appl. No.: 140,853

[30] Foreign Application Priority Data
May 11, 1970  Sweden.............................. 6391/70

[52] U.S. Cl.................................. 188/296, 60/54
[51] Int. Cl............................................ F16f 57/04
[58] Field of Search........................... 188/290, 296; 24/99 A; 60/54

[56] References Cited
UNITED STATES PATENTS

| | | | |
|---|---|---|---|
| 3,072,222 | 1/1963 | Kugel et al............... | 60/54 X |
| 1,817,650 | 8/1931 | Ryder..................... | 60/54 X |
| 2,507,167 | 5/1950 | Lemmerman............. | 74/99 A X |
| 2,586,136 | 2/1952 | Wyndham................ | 60/54 |
| 2,978,915 | 4/1961 | Metcalf................... | 74/99 A X |
| 3,371,890 | 3/1968 | Mehe...................... | 188/296 X |

Primary Examiner—George E. A. Halvosa
Attorney—Munson & Fiddler

[57] ABSTRACT

A device for regulating the driving torque and energy absorption in hydraulic energy absorbing means such as employed in aircraft arresting mechanisms, consisting in a liquid reservoir housing in which a bladed rotor is rotative, said rotor having its blades surrounded by fixed vanes of a curvature different from that of the blades of the rotor. A ring is mounted above the blades, the ring having an annular groove or channel in which a channel-shaped capsule is positioned, the capsule being adjustable up or down in the groove, a rotative adjustment ring is mounted on a part of the housing and an outer ring carries rods that enter the housing to contact with the capsule, and the outer ring has parts engaging in guide means on the inner ring, whereby rotative adjustment of the inner ring causes raising or lowering of the capsule with respect to the rotor blades.

1 Claim, 1 Drawing Figure

PATENTED JUN 19 1973
3,739,884
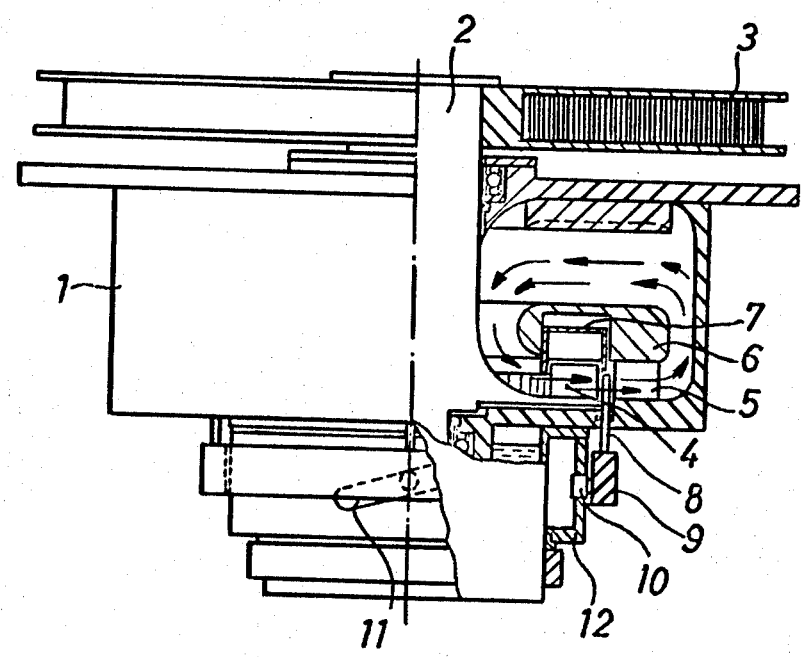
LARS H. MYHR
and LARS-ÅKE H. SVENSSON
INVENTORS
BY
MUNSON & FIDDLER
ATTORNEY

MEANS AND METHOD FOR REGULATING A HYDRAULIC ENERGY ABSORBING DEVICE

The present invention relates to hydraulic energy absorbing devices and especially those used for arresting aircraft, and in which devices liquid is pumped around a rotor and stator lattice, and the invention is concerned with a means for regulating the driving torque and energy absorption.

In hydraulic energy absorbing devices, the braking torque is substantially proportional to the square of the speed of the rotor, and the easiest way of regulating the torque at a given number of revolutions is to regulate the flow of liquid through the rotor and stator lattice.

One known method employs the expedient of baffling the flow between the rotor and stator lattice by means of a mechanical baffle in the form of a ring inserted completely or partially between the rotor and stator, either in front of or behind the rotor blades.

With this method however, it is not possible to vary the torque over the whole range, from zero to full torque, due to the fact that the liquid reservoir is forced to rotate with the rotor, it being necessary to apply energy to the rotor in order to compensate for friction in the liquid and between the liquid and the walls of the energy absorbing device. This provides a certain torque when the flow is fully baffled and a not insignificant moment of inertia upon acceleration.

This problem is solved by the present invention by reason of the fact that the blade lattice of the rotor with a fully choked absorbing device is encapsulated, whereby the liquid between the blades behaves as a solid body and the liquid in the liquid chamber of the absorbing device is practically unaffected by the rotation of the rotor, with the exception of negligible energy transmission because of friction between the rotor shaft and the liquid. In order to be able to regulate the flow of liquid, the rotor blades are either partially or fully exposed, thereby permitting the liquid to be pumped around the rotor-stator lattice at a rate of flow dependent on the degree to which the blades are exposed.

This regulating method provides a minimum of energy absorption with a fully encapsulated rotor and practically a linear variation of the braking gorque as a function of the degree of encapsulation, which gives the same torque gradient throughout the entire regulating range and facilitates the dimensioning of the regulating system. Moreover, with this method there is obtained a minimum moment of inertia with a fully encapsulated rotor, which is extremely important when using energy absorbing devices of this type with aircraft arresting systems. The arrangement is also very suitable for use with absorbing devices of the so-called pre-rotating type with which the requirement on low idling torque is very high.

The invention is illustrated in the accompanying drawing in which the FIGURE shows one-half in an external view and the other half in axial section.

The energy absorbing device includes a liquid reservoir housing 1 within which is journalled a shaft 2 which supports at the upper end thereof a belt drum 3 and at the lower end blades 4, which are combined to form a ring of blades surrounded by stationary guide vanes 5 forming a guide vane ring. The blade ring and the guide vanes of the guide vane ring are curved in opposite directions. The guide vanes are secured between the lower end wall of the reservoir housing 1 and a ring 6 provided with an annular recess for receiving an annular, U-shaped capsule 7, the limbs of which extend toward the blade ring 4. The capsule is capable of being moved axially whereby the blades 4 can be enclosed in the capsule 7 to a greater or lesser extent according to the axial position of the capsule.

The capsule 7 rests on rods 8, which in turn are attached to an axially movable ring 9 having guide rollers 10 running in an inclined groove 11 located in a rotatable operating ring 12. By rotating the ring 12, the capsule can be caused to take a certain position, whereupon a quantity of liquid is encapsulated and accompanies the movement of the blades and a through flow area is formed which provides the desired torque and degree of energy absorption.

The capsule can be operated in many different ways. The ring 12 can be rotated if desired by means of an appropriate servo motor.

The position of the capsule can be controlled during the arrester landing sequence of an aircraft by assessing the position of the aircraft or by measuring the retardation and speed, the signals being processed in a regulating system.

What is claimed is:

1. A control device for regulating the driving torque and energy absorption in a hydraulic energy absorbent for aircraft arresting device and the like comprising a housing containing the liquid energy absorbent, a rotative shaft extending through said housing, said shaft supporting a series of radially arranged blades forming a ring adapted to rotate adjacent the bottom of said housing, a series of stationary vanes surrounding said blade ring within said housing, said blades and said vanes being curved in relatively opposite directions, a stationary ring member within said housing superposed on said vanes, an annular channel in said ring member having an annular recess facing said blades, an annular capsule having a generally U-shaped cross section reciprocably accommodated in said recess with the legs thereof adapted to slide over and cover said blades, said capsule engaging one end of a rod slidably engaging the bottom wall of said housing, the other end of said rod extending beyond said bottom wall and being connected to an axially adjustable member having guide means engaging an inclined groove located in a movable operating member connected to the bottom wall of said housing and being effective by movement thereof to adjust said rods to raise and lower said capsule over said blades whereby to control the torque from zero to maximum without liquid removal.

* * * * *